United States Patent
Moskal et al.

(10) Patent No.: US 9,851,456 B2
(45) Date of Patent: Dec. 26, 2017

(54) TOF-PET TOMOGRAPH AND A METHOD OF IMAGING USING A TOF-PET TOMOGRAPH, BASED ON A PROBABILITY OF PRODUCTION AND LIFETIME OF A POSITRONIUM

(71) Applicant: UNIWERSYTET JAGIELLONSKI, Cracow (PL)

(72) Inventors: Pawel Moskal, Czulowek (PL); Ines Moskal, Czulowek (PL); Gabriel Moskal, Czulowek (PL)

(73) Assignee: UNIWERSYTET JAGIELLONSKI, Krakow (PL)

( * ) Notice: Subject to any disclaimer, the term of this patent is extended or adjusted under 35 U.S.C. 154(b) by 158 days.

(21) Appl. No.: 14/915,260

(22) PCT Filed: Aug. 29, 2014

(86) PCT No.: PCT/EP2014/068374
§ 371 (c)(1),
(2) Date: Feb. 29, 2016

(87) PCT Pub. No.: WO2015/028604
PCT Pub. Date: Mar. 5, 2015

(65) Prior Publication Data
US 2016/0216385 A1    Jul. 28, 2016

(30) Foreign Application Priority Data
Aug. 30, 2013   (PL) .......... 405185

(51) Int. Cl.
*G01T 1/29*     (2006.01)
*G01T 1/16*     (2006.01)

(52) U.S. Cl.
CPC .......... *G01T 1/2985* (2013.01); *G01T 1/1603* (2013.01)

(58) Field of Classification Search
CPC ................. G01T 1/2985; G01T 1/1603
(Continued)

(56) References Cited
U.S. PATENT DOCUMENTS 6,225,631 B1 *  5/2001  Mastrippolito ....... G01T 1/2985
                                                250/363.02
2012/0112079 A1 *  5/2012  Moskal ............. G01T 1/2985
                                                250/363.03
(Continued)

*Primary Examiner* — David Porta
*Assistant Examiner* — Gisselle Gutierrez
(74) *Attorney, Agent, or Firm* — Mark M. Friedman

(57) ABSTRACT

A tomograph for imaging an interior of an examined object, the tomograph comprising: TOF-PET detection modules configured to register annihilation quanta and deexcitation quanta and a data reconstruction system (103, 203, 303) configured to reconstruct an ortho-positronium $t_o$-$p_s$(x,y,z) lifetime image and a probability of production of positronium $P_{poz}$(x,y,z) as a function of position in the imaged object, on the basis of a difference (Δt) between a time of annihilation ($t_a$) and a time of emission of a deexcitation quantum ($t_e$), wherein the TOF-PET detection modules (101, 201, 301) comprise scintillators having a time resolution of less than 100 ps.

25 Claims, 4 Drawing Sheets

(58) Field of Classification Search
USPC .......................................................... 250/362
See application file for complete search history.

(56) References Cited

U.S. PATENT DOCUMENTS

| | | | |
|---|---|---|---|
| 2012/0175523 A1* | 7/2012 | Moskal | G01T 1/2985 250/363.03 |
| 2014/0008542 A1* | 1/2014 | Olcott | A61B 6/037 250/363.03 |
| 2016/0209483 A1* | 7/2016 | Moskal | G01R 33/481 |
| 2016/0209514 A1* | 7/2016 | Moskal | G01T 1/2985 |
| 2016/0209523 A1* | 7/2016 | Moskal | G01T 1/2985 |
| 2016/0209528 A1* | 7/2016 | Czerwinski | G01T 1/2985 |

* cited by examiner

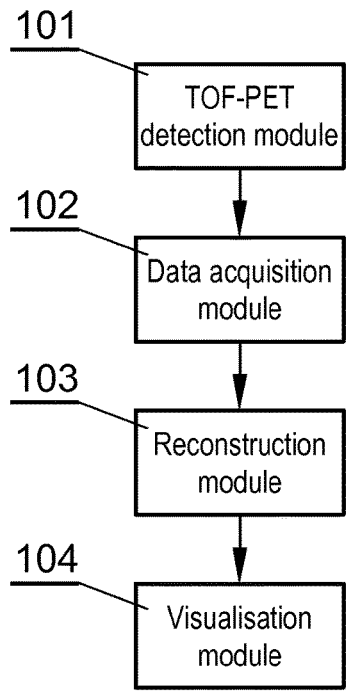
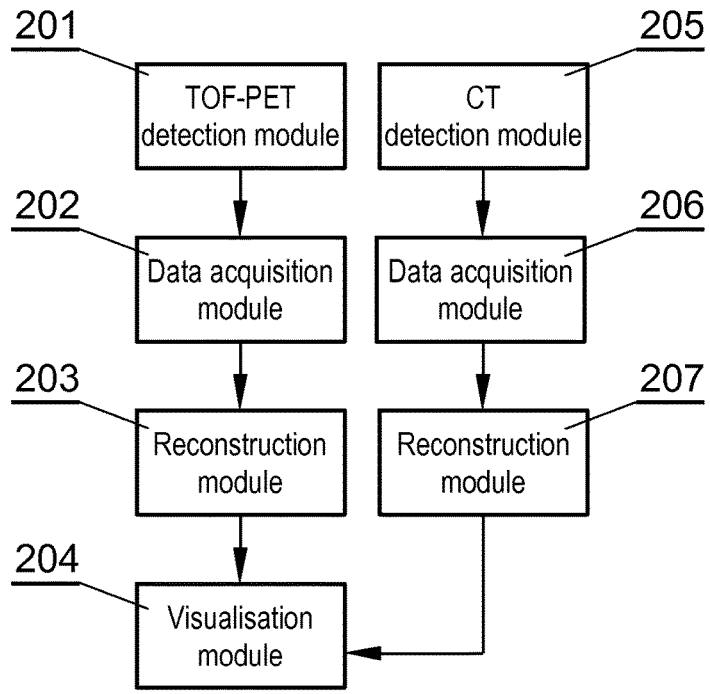
Fig. 4  Fig. 5
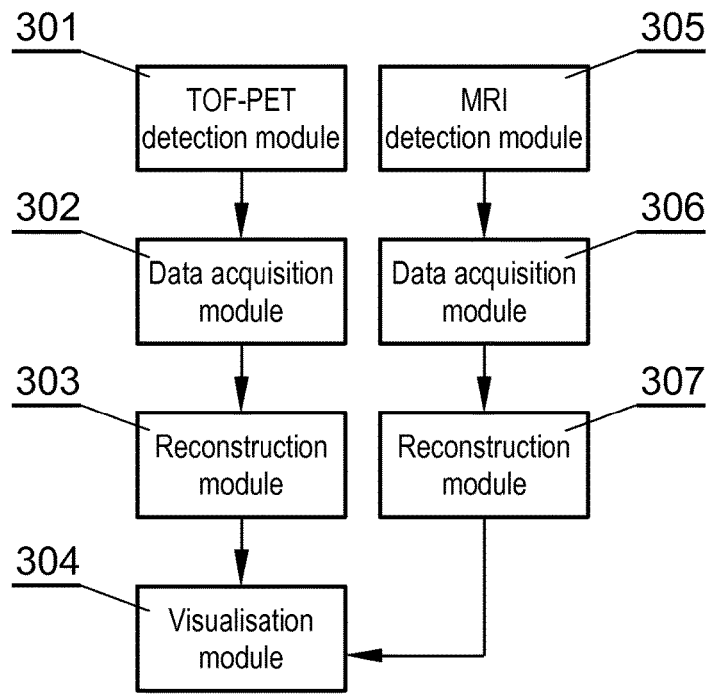
Fig. 6

TOF-PET TOMOGRAPH AND A METHOD OF IMAGING USING A TOF-PET TOMOGRAPH, BASED ON A PROBABILITY OF PRODUCTION AND LIFETIME OF A POSITRONIUM

TECHNICAL FIELD

The present disclosure relates to a TOF-PET tomograph and a method of imaging using a TOF-PET tomograph, based on a probability of production and lifetime of a positronium.

BACKGROUND

Images of the interiors of bodies may be acquired using various types of tomographic techniques, which involve recording and measuring radiation from tissues and processing acquired data into images.

One of these tomographic techniques is positron emission tomography (PET), which involves determining spatial distribution of a selected substance throughout the body and facilitates detection of changes in the concentration of that substance over time, thus allowing to determine the metabolic rates in tissue cells.

The selected substance is a radiopharmaceutical administered to the examined object (e.g. a patient) before the PET scan. The radiopharmaceutical, also referred to as an isotopic tracer, is a chemical substance having at least one atom replaced by a radioactive isotope, e.g. $^{11}C$, $^{15}O$, $^{13}N$, $^{18}F$, selected so that it undergoes radioactive decay including the emission of a positron (antielectron). The positron is emitted from the atom nucleus and penetrates into the object's tissue, where it is annihilated in reaction with an electron present within the object's body.

The phenomenon of positron and electron annihilation, constituting the principle of PET imaging, consists in converting the masses of both particles into energy emitted as annihilation photons, each having the energy of 511 keV. A single annihilation event usually leads to formation of two photons that diverge in opposite directions at the angle of 180° in accordance with the law of conservation of the momentum within the electron-positron pair's rest frame, with the straight line of photon emission being referred to as the line of response (LOR). The stream of photons generated in the above process is referred to as gamma radiation and each photon is referred to as gamma quantum to highlight the nuclear origin of this radiation. The gamma quanta are capable of penetrating matter, including tissues of living organisms, facilitating their detection at certain distance from object's body. The process of annihilation of the positron-electron pair usually occurs at a distance of several millimeters from the place of the radioactive decay of the isotopic tracer. This distance constitutes a natural limitation of the spatial resolution of PET images to a few millimeters.

In addition to the direct annihilation, also annihilation via electron-positron bound state may exist. Annihilation in the bound state occurs along with creation of the quasi-stable state with the so-called positronium (Ps). Dimensions of positronium are close to the size of the hydrogen atom; however positronium energy structure is significantly different from the energy structure of the hydrogen atom. Positronium, similarly to the hydrogen atom, may be formed in a singlet state of the anti-parallel spins orientation, the so-called para-positronium (p-Ps), with the average lifetime in a vacuum of $\tau_{p-Ps}$=0.125 ns, or in a triplet state of parallel spin orientation, the so-called ortho-positronium (o-Ps) with the average lifetime in a vacuum of $\tau_{o-Ps}$=142 ns. The lifetime of ortho-positronium $\tau_{o-Ps}$ decreases to a few nanoseconds in the spaces between cells, while in the case of materials of high electron density, such as metals, o-Ps is not formed at all. Due to the symmetry of charge conjugation, p-Ps undergoes annihilation with emission of an even number of gamma quanta (most often, two quanta), while o-Ps undergoes annihilation with emission of an odd number of gamma quanta (most often, three quanta). The probability of o-Ps creation is three times greater than the probability of p-Ps, creation, whereas the multiple interaction of positronium with environment electrons cause that at the moment of the annihilation, the o-Ps to p-Ps ratio may differ from three. Processes leading to changes in this ratio are called positronium quenching processes. One of the quenching processes is the so-called "pick-off" process, which consists in the fact that the positron bound with electron in positronium annihilates with another electron from the environment. This process involves a quick break of positron-electron "bond" in positronium and immediate annihilation of positron with an electron from the environment. Another example of the process leading to shortening the lifetime of o-Ps is the o-Ps transition into the state of p-Ps. The probability of the positronium quenching processes depends on the size of electron-free volumes, wherein the larger the free volumes in the material, the less the probability of occurrence of the quenching processes and the longer the lifetime of o-Ps.

For free positrons, the direct annihilation with electrons into two gamma quanta is about 370 times more likely than annihilation into 3 gamma quanta, and almost a million times more likely than annihilation into four gamma quanta. Such drastic differences are mainly due to the small value of the electromagnetic coupling constant of $\frac{1}{137}$. This means that annihilation usually takes place into two gamma quanta. Annihilations that occurred with creation, in an intermediate state, of ortho-positronium also occur, in the vast majority, into two gamma quanta because they are the result of either conversion of ortho-positronium into para-positronium or interaction of the positron with the electron not bound to it.

Currently, in the PET technique, the phenomenon of producing positronium is neither recorded nor used for imaging. Using conventional PET tomographs gives information on the distribution of a radiopharmaceutical in the body of the object. The detection system of conventional PET tomographs is programmed to record data on annihilation into two gamma quanta of energy of 511 keV.

A PET scanner comprises detection devices used to detect gamma radiation as well as electronic hardware and software allowing to determine the position of the positron-electron pair annihilation on the basis of the position and time of detection of a particular pair of the gamma quanta. The radiation detectors are usually arranged in layers forming a ring around object's body and are mainly made of an inorganic scintillation material. A gamma quantum enters the scintillator, which absorbs its energy to re-emit it in the form of light (a stream of photons). The mechanism of gamma quantum energy absorption within the scintillator may be of dual nature, occurring either by means of the Compton's effect or by means of the photoelectric phenomenon, with only the photoelectric phenomenon being taken into account in calculations carried out by current PET scanners. Thus, it is assumed that the number of photons generated in the scintillator material is proportional to the energy of gamma quanta deposited within the scintillator.

When two annihilation gamma quanta are detected by a pair of detectors at a time interval not larger than several nanoseconds, i.e. in coincidence, the position of annihilation point along the line of response may be determined, i.e. along the line connecting the detector centres or the points within the scintillator strips where the energy of the gamma quanta was deposited. The coordinates of annihilation place are obtained from the difference in times of arrival of two gamma quanta to the detectors located at both ends of the LOR. In the prior art literature, this technique is referred to as the time of flight (TOF) technique, and the PET scanners utilizing time measurements are referred to as TOF-PET scanners. This technique requires that the scintillator has time resolution of a few hundred picoseconds.

Light pulses reaching the scintillator can be converted into electric pulses by means of photomultipliers or photo-diodes. Electric signals from the converters carry information on positions and times of the annihilation quanta subjected to detection, as well as on the energy deposited by these quanta.

The standard detection systems of PET tomographs comprises a scintillator layer surrounding the detection chamber, which absorb gamma quanta, being a product of radiopharmaceutical decay, and emits scintillation photons. The most commonly used scintillators are inorganic crystals. In addition, there are known polymer scintillators for use in PET tomographs, as disclosed by patent applications WO2011/008119 and WO2011008118; they enable achieving much better time resolution of the detection system—at the level of 100 ps.

Also hybrid tomographs are known in which the PET technique is combined with other known imaging techniques such as magnetic resonance imaging (MRI) or computed tomography (CT). Using these devices, hybrid images are obtained, for example, PET/CT or PET/MRI, which provide complementary information: anatomical, functional and morphological. CT tomography provides anatomical image, PET provides metabolic image, while the MR tomography provides morphological image; the PET imaging is particularly advantageous for early detection of metabolic changes—before occurrence of morphological changes detectable via CT or MR imaging. Combination of metabolic (PET) and anatomical (CT) images, or combination of PET image with the morphological (MR) image, is particularly advantageous because it allows precise localization of metabolic changes in individual body parts and determination of degree of these changes.

The parameter determining the degree of metabolic changes recorded by PET is SUV index (Standardised Uptake Value), which expresses the value of the uptake of the radiopharmaceutical in a volume unit (voxel) of the organism in relation to the average value of the uptake of the radiopharmaceutical throughout the body. The higher the SUV the greater the probability of occurrence of cells with disturbed metabolism in a given region of tissue.

The measurement of the lifetime of positrons is used to study the structure of matter at the atomic level. The Positron annihilation lifetime spectroscopy (PALS) allows collect data in the form of positron lifetime spectra, based on which a degree of defect of material of the test sample can be determined. PALS spectroscopes, similarly as PET tomographs, include the scintillators detection system which is connected to the computer. PALS spectrometer measurement consists in introduction of a sample of material with an isotope tracer between detectors and registration of gamma quanta. Positron lifetime information contained in the PALS spectrum is read, for example, by means of a computer program as a result of a numerical analysis consisting in matching the theoretical function to the experimental time spectrum. Such analysis enables determination of the several components of positron lifetime, including ortho-positronium lifetime.

Literature includes numerous publications concerning measurement of lifetime of positrons using the PALS technique.

The article "Badanie zmian wolnych objętości w strukturze polimerowych dwuogniskowych soczewek kontaktowych metodą anihilacji pozytonów" [*Study of changes in free volume in the polymer structure of bifocal contact lenses using the positron annihilation method*" (J. Filipecki et al., Polimery w Medycynie 2010 [*Polymers in Medicine* 2010], Vol. 40, No. 4, pp. 27-33) published results of research on positron lifetime value in the polymer material used for production of contact lenses. As a source of positrons, the radioactive $^{22}$Na isotope was used. Positron lifetime values were calculated using a computer program taking into account the time resolution of the detection system of 270 ps. The best match between the theoretical function and the points constituting the time spectrum was obtained by dividing positron lifetime spectra into three components. The first and the second component were introduced to the program as the following constant values: $\tau_{p-Ps}$=0.125 ns and $\tau_b$=0.36 ns (average lifetime of positrons with free annihilation). For all samples measured using the spectrometer, the third component $\tau_{o-Ps}$ responsible for the process of annihilation of ortho-positronium related with the process of ortho-positronium "pick-off" by free volume in the polymer matrix was calculated. The study showed that the lifetime of ortho-positronium $\tau_{o-Ps}$ reflects the average size of free volume present in the polymer matrix.

The article "Influence of neoplastic therapy on the investigated blood using positron annihilation lifetime spectroscopy" (R. Pietrzak et al. NUKLEONIKA 2013, 58 (1): pp. 199-202) describes an experiment in which the PALS spectrometer was used to measure lifetime of positrons in blood samples taken from healthy examined objects and examined objects with cancer. As a source of gamma radiation, $^{22}$Na isotope was used. The spectrometer used was characterized by the time resolution of 226 ps. Using a computer program, the average lifetime of ortho-positronium in blood samples of normal and disturbed metabolism was calculated. The results showed that the average radius of the volumes between cells is reduced from about 0.25 nm in blood cells of normal metabolism to about 0.12 nm in blood cells with a disturbed metabolism.

Thus, the larger the ratio of the atom-free volume to the volume of high electron density, the greater the probability that a positron emitted from the radiopharmaceutical creates a bounded state with the electron. The probability of creation and lifetime of positronium depends on the electromagnetic environment (density and momentum distribution of electrons), in which the positron interacts with an electron, which in turn depends on the size of the space between cells; these, in turn, depend on the type of tissue and, in particular, on the stage of development of metabolic disorders (age of ill cells).

It would be desirable to develop a method for measuring the lifetime of positrons in living organisms without the need for invasive sampling, and the development of a tomograph which would enable imaging of positron lifetime distributions as a function of position in the body, providing information about the structure of tissue at the atomic level and allowing for estimating the degree of cell metabolism disorder.

SUMMARY

There is disclosed a tomograph for imaging an interior of an examined object, the tomograph comprising: TOF-PET detection modules configured to register annihilation quanta and deexcitation quanta and a data reconstruction system configured to reconstruct an ortho-positronium $\tau_{o\text{-}Ps}(x,y,z)$ lifetime image and a probability of production of positronium $P_{poz}(x,y,z)$ as a function of position in the imaged object, on the basis of a difference ($\Delta t$) between a time of annihilation ($t_a$) and a time of emission of a deexcitation quantum ($t_e$), wherein the TOF-PET detection modules comprise scintillators having a time resolution of less than 100 ps.

Preferably, the TOF-PET detection modules comprise polymer scintillation strips for absorbing gamma quanta.

Preferably, the TOF-PET detection modules comprise polymer scintillation panels for absorbing radiation.

Preferably, the tomograph is a hybrid TOF-PET/CT tomograph further comprising a CT detection module and a visualization module configured to receive hybrid images containing information about the lifetime of ortho-positronium, the probability of production of positronium, the density distribution of the radiopharmaceutical, and the electron density distribution as a function of position.

Preferably, the tomograph is a hybrid TOF-PET/MRI tomograph further comprising an MRI detection module, a visualization module to receive hybrid images containing information about the lifetime of ortho-positronium, the probability of production of positronium, the density distribution of the radiopharmaceutical, and the hydrogen atoms density distribution as a function of position.

There is also disclosed a method of imaging using a TOF-PET tomograph, the method comprising the steps of: introducing into a scintillation chamber of the tomograph an object comprising a radioisotope to emit positrons and deexcitation gamma quanta; recording the deexcitation quanta and annihilation quanta in a TOF-PET detection module comprising scintillators having a time resolution less than 100 ps; determining detection modules that registered the annihilation gamma quanta and detection modules that registered the deexcitation quanta; performing reconstruction of the position of annihilation into two gamma quanta ($r_a$) and the time of annihilation into two gamma quanta ($t_a$); performing reconstruction of a time difference ($\Delta t$) between a time of the positron annihilation $t_a$ and an emission time of deexcitation quantum $t_e$, where the position of emission of the deexcitation quantum is considered as the position of annihilation of the positron; calculating, for every voxel, an average lifetime of ortho-positronium $\tau_{o\text{-}Ps}(x,y,z)$ and a probability of production of positronium $P_{poz}(x,y,z)$.

Preferably, the daughter nucleus of the radiotracer emits deexcitation quantum in less than 100 ps from the time of the positron emission.

Preferably, the detection modules that registered the annihilation quanta and detection modules that registered the deexcitation quanta are distinguished by the difference in the values of energy deposited in those modules by the gamma quanta, whereas the range of the energy used to identify the annihilation and deexcitation gamma quanta is optimized for the energy resolution of the tomograph and for the energy of deexcitation quantum by maximizing the probability product of correct identification and selection efficiency as a function of the $E_{min}$ value.

Preferably, the method comprises recording the events wherein the detection modules registered, within a single time interval, two annihilation gamma quanta from the annihilation into two gamma quanta.

Preferably, the method comprises recording the events wherein the detector modules registered two annihilation quanta from annihilation into two gamma quanta, and at least one deexcitation quantum from deexcitation of the daughter nucleus.

Preferably, the method comprises recording the events wherein the detector modules registered three gamma quanta from annihilation into three gamma quanta, and at least one deexcitation quantum from deexcitation of the daughter nucleus.

Preferably, the annihilation vector coordinates ($r_a$) are determined analytically from the position of measurement of gamma quanta reaction ($r_1$, $r_2$) in the detection modules and the difference in times of arrival of the quanta at the reaction position ($t_1$, $t_2$).

Preferably, the annihilation time is determined on the basis of the difference in times of arrival of the quanta at the reaction position ($r_1$, $r_2$).

Preferably, the position ($r_a$) and time of annihilation ($t_a$) are determined by minimizing the variable $\chi^2$ ($v_a$, $t_a$), wherein the number of searched voxels is limited to voxels located in the plane defined by trajectories of movement of three gamma quanta, wherein the voxel in which the annihilation occurred ($v_a$) is the one for which the variable $\chi^2$ reached the minimum value ($\chi^2$ min).

Preferably, the method comprises determining coplanarity of the registered gamma quanta on the basis of the value $\chi^2$ min, and rejecting the events for which at least one gamma quantum is scattered.

Preferably, the method comprises reconstructing the image of density of distribution of the radiopharmaceutical $M(x, y, z)$ for the recorded events for which the positron was subject to annihilation into two gamma quanta.

Preferably, in the case of registered events in which the positron was subject to annihilation into two or three gamma quanta, the values of the lifetime of ortho-positronium ($\tau_{o\text{-}Ps}$) and the probability of production of positronium ($P_{poz}$) are reconstructed for designated areas ($\Omega$).

Preferably, in the first step, the morphometric-average parameters $\tau_{o\text{-}Ps}$ and $P_{poz}$ for the entire scanned area are determined; next, the average parameters $\tau_{o\text{-}Ps}$ and $P_{poz}$ are used as initial parameters in matching, performed separately for each voxel.

Preferably, the obtained image comprises information about the lifetime of ortho-positronium, the probability of production of positronium and the density distribution of the radiopharmaceutical as a function of position in the examined object.

Preferably, the method comprises acquisition of data by using the CT detector module, and generating a hybrid image that contains information on the lifetime of positronium $\tau_{o\text{-}Ps}(x, y, x)$, the probability of production of positronium $P_{poz}(x, y, z)$, the density of radiopharmaceutical distribution $M(x, y, z)$ and the electron density distribution $A(x, y, z)$ as functions of position in the object.

Preferably, the method comprises data acquisition by using the MRI detector module, and generating a hybrid image that contains information on the lifetime of positronium $\tau_{o\text{-}Ps}(x, y, x)$, the probability of production of positronium $P_{poz}(x, y, z)$, the density of radiopharmaceutical distribution $M(x, y, z)$ and the hydrogen atoms density distribution $B(x, y, z)$ as a function of position in the object.

BRIEF DESCRIPTION OF FIGURES

Example embodiments are presented on a drawing wherein:

FIG. 4 presents structure of the TOF-PET tomograph for the process depicted in FIG. 1;

FIG. 5 presents structure of the hybrid TOF-PET/CT tomograph for realisation of the process depicted in FIG. 2;

FIG. 6 presents structure of the hybrid TOF-PET/MRI tomograph for realisation of the process depicted in FIG. 3.

DETAILED DESCRIPTION

For registration of gamma quanta by the presented means, polymer TOF-PET detectors described in patent applications WO2011/008118 or WO2011/008119 can be used.

Figure 1:
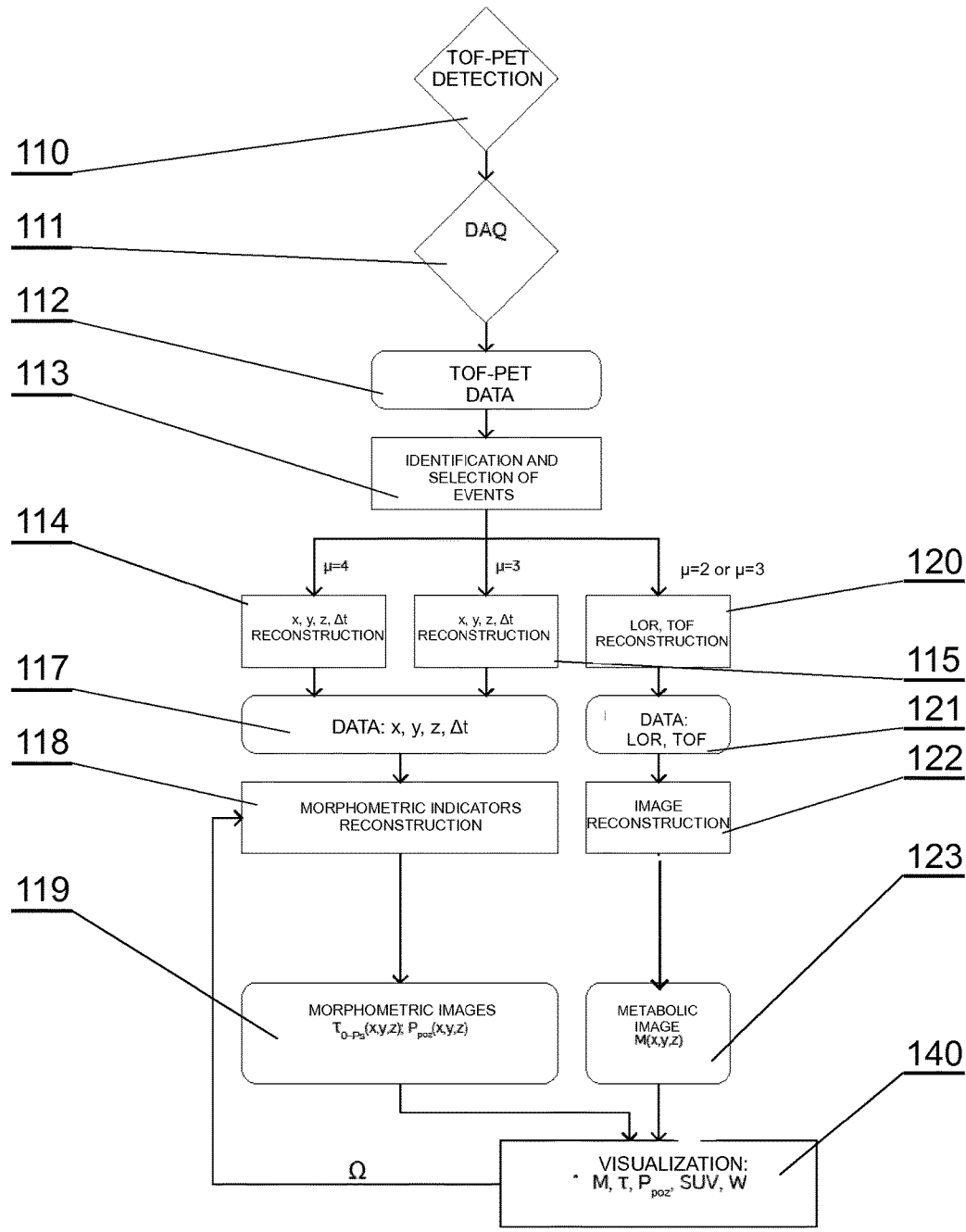
FIG. 1 is a block diagram of the process of reconstruction of images of distribution of lifetime of ortho-positronium in the first embodiment in an example of TOF-PET tomograph.

FIG. 1 is a block diagram of the process of obtaining images of distribution of lifetime of ortho-positronium as a function of position in an examined object (e.g. a living organism) based on an example of TOF-PET tomograph; TOF-PET tomograph comprises a detector system 110 which may include multiple detector modules and a scintillation chamber, into which the examined object after application of the radiopharmaceutical is introduced for registration of gamma radiation.

A single detector module is constructed of a scintillator coupled to at least one photomultiplier, or to a photomultiplier system, wherein any detection system registering gamma radiation allowing for tomograph time resolution below 100 ps may be used. For example, in the presented method, images of positron lifetime can be prepared using tomograph with polymer scintillation strips, wherein each detection module comprises polymer scintillators to achieve time resolution of less than 100 ps.

Before scanning with the TOF-PET tomograph, radiopharmaceutical with an radioactive tracer is administered to an examined object, the tracer is selected from radioactive isotopes whose atomic nuclei undergo $\beta^+$ decay and upon emission of positrons they change into daughter nuclei remaining in anexcited state for some time, then deexcitating through emission of one or several gamma quanta, while the lifetime of the daughter nucleus in an excited state must not exceed 100 ps. An example of a radiotracer meeting the above criteria is the isotope of oxygen: $^{14}O$, which by emitting a positron changes into nitrogen isotope: $^{14}N$ in the excited state with energy of about 2.3 MeV and average lifetime of about 0.07 ps.

The procedure begins with starting the detection system in step 110, which records the gamma quanta from annihilation into two gamma quanta of energy 511 keV, analogously to the known TOF-PET tomograph, and registers gamma quanta from annihilation into three gamma quanta, as well as deexcitation gamma quanta resulting from deexcitation of daughter nucleus of radiotracer.

Gamma quanta created as result of annihilation and deexcitation of daughter nucleus of radiotracer are changed into electrical signals by photomultipliers and sent in step 111 via cables to electronic units constituting the data acquisition system (DAQ).

The data acquisition system, with respect to the trigger signal, determines the amplitude and time of creation of signals and sends them in step 112 as digital data to a recorder, where they can be saved to disk; the trigger signal is a result of logical operations performed by the electronic system in step 111 in order to make a decision to save or reject the signal. In the next step, 113, by means of a computer an identification and selection of such signals is performed which were registered in step 110 in at least two detection modules within a predetermined time interval (a few nanoseconds).

Further analysis and processing by a computer program will be carried out only for those signals for which within one time interval:

two gamma quanta were registered: $\mu=2$, and both gamma quanta meet the criteria for identification of quanta from annihilation of electron with positron into two gamma quanta;

three gamma quanta were registered: $\mu=3$, and two of the three gamma quanta meet the criteria for identification of quanta from annihilation of electron with positron into two gamma quanta and the third gamma quantum meets the criterion for identification of gamma quanta from deexcitation of daughter nucleus;

four gamma quanta were registered: $\mu=4$, and at least one gamma quantum meets the criterion for identification of gamma quanta from deexcitation of daughter nucleus;

where $\mu$ is a multiplicity of an event, i.e., the number of registered gamma quanta within a single time interval, resulting from decay of radioactive radiotracer atom.

Data obtained from detection modules, which registered event multiplicity of $\mu=2$ and $\mu=3$ can be used to reconstruct the images of density distribution of the radiopharmaceutical in examined object's body: M (x, y, z), based on known image reconstruction methods of PET 120, 121, 122, 123, for example by means of TOF-PET technique, wherein for events with the multiplicity of $\mu=2$ what is used is the data obtained from both detection modules 110, and for events of multiplicity of $\mu=3$, in the first step the modules that registered annihilation quanta are identified, since only this data is used to reconstruct a metabolic image M (x, y, z) 122. In step 120 reconstruction of the following data is carried out: LOR (Line of Response) and TOF (Time of Flight), which is obtained in step 121 and on this basis image reconstruction is performed in step 122, thereby obtaining a metabolic image in step 123.

For events with multiplicity of $\mu=3$ and $\mu=4$ with annihilation into two gamma quanta, data 113 and 117 from detection modules is used to reconstruct 118 of additional two images:

a) image of distribution of lifetime of ortho-positronium as a function of position in an examined object $\tau_{p\text{-}Ps}(x, y, z)$ 119 and b) image of distribution of probability of creation of positronium as a function of position in an examined object $P_{poz}(x, y, z)$ 119, wherein x, y and z coordinates indicate the centre of a given voxel in the body of the examined object.

In addition for events with $\mu=4$ with annihilation into three gamma quanta, data 117 obtained from the detection modules 110 is used to reconstruct the additional image 119 of distribution of lifetime of ortho-positronium ($\tau_{o\text{-}Ps}$) wherein the image is obtained for larger areas of the body, due to low statistics of events (low probability of annihilation into three gamma quanta).

Detectors 110 that registered annihilation quanta and deexcitation quanta are identified in such a way that:
- the maximum value of energy that an annihilation gamma quantum can deposit in the scintillator is calculated,
- the maximum value of energy that an deexcitation gamma quantum can deposit in the scintillator is calculated,
- the energy criterion of identification of annihilation and deexcitation gamma quanta ($E_{min}$) is determined, whose value is characteristic for a given PET tomograph.

The maximum energy that an annihilation and deexcitation gamma quantum can deposit in the scintillator material—$E_{max}$ is determined taking into account the fact that distribution of energy deposited in the scintillator is continuous in the range from 0 to $E_{max}$, for example, using the formula:

$$E_{max} = (E_\gamma/(m_e/2E_\gamma + 1)) \quad \text{(Formula I)}$$

where:
$E_\gamma$—energy of emitted gamma quantum (annihilation or deexcitation)
$m_e$—electron mass Formula I may be used to calculate $E_{max}$ in scintillators for which the photoelectric effect does not occur for absorbed gamma quanta of energy in the order of 1 MeV, such as polymer scintillators.

For example, for TOF-PET tomograph with polymer scintillation strips, the value $E_{max}$ for annihilation quanta, calculated according to the Formula I, is about 340 keV, while for deexcitation quantum from nucleus $^{14}N$ deexcitation, which is a daughter nucleus in the case of the use of radiopharmaceutical traced with oxygen $^{14}O$ isotope, the value of $E_{max}$ is about 2070 keV. This high difference in values of $E_{max}$ of annihilation and deexcitation quanta deposited in scintillators allows them to be identified.

The energy criterion $E_{min}$ can be, for example, determined by maximizing the probability product of correct identification and efficiency of selection as a function of value of $E_{min}$, while $E_{min}$ is to be optimized for a given energy resolution of detection modules and energy value of deexcitation quantum.

For example, for polymer scintillator strips read out by two photomultipliers, whose energy resolution is about ten percent, the energetic criterion for annihilation quanta of $E_{max}$=340 keV is $E_{min}$=400 keV. This means that every registered signal resulting from depositing energy $\leq E_{min}$, is identified as the annihilation quantum signal and every registered signal resulting from depositing energy $>E_{min}$ is identified as deexcitation quantum signal.

Other events: when three detection modules registered energy greater than $E_{min}$ or no module registered energy of a value greater than $E_{min}$, they are not used for image reconstruction for events $\mu$=3 and $\mu$=4.

In the next step, for events with multiplicity $\mu$=3 with annihilation into two gamma quanta, position ($\vec{r}_a$) and time ($t_a$) of annihilation is determined in step 115. For the purpose of computing, the momentum conservation principle implying movement of annihilation quanta opposite to each other in a straight line is used. The coordinates of the point of annihilation into two gamma quanta can be determined analytically based on the measurement of position of reaction of gamma quanta in detection modules and difference in times of arrival of these quanta to the reaction positions according to the known formula:

$$\vec{r}_a = \frac{\vec{r_1} + \vec{r_2}}{2} + \frac{\vec{r_1} - \vec{r_2}}{|\vec{r_1} - \vec{r_2}|} \cdot (t2 - t1) \cdot \frac{c}{2} \quad \text{(Formula II)}$$

where:
$\vec{r}_a$—vector indicating the point of annihilation
$\vec{r_1}$—vector of position of reaction of gamma quantum in detection module 1
$t_1$—gamma quantum reaction time registered in module 1
$\vec{r_2}$—vector of position of reaction of gamma quantum in detection module 2
$t_2$—gamma quantum reaction time registered in module 2
c—speed of light in vacuum Time of annihilation into two gamma quanta can be calculated from the formula:

$$t_a = \frac{t_1 + t_2}{2} \quad \text{(Formula III)}$$

$t_a$—The time of annihilation at a point, whose coordinates are defined by the vector $\vec{r}_a$
$t_1$—gamma quantum reaction time registered in module 1
$t_2$—gamma quantum reaction time registered in module 2

The position and time of annihilation using the presented method may also by determined for events with a multiplicity of $\mu$=4, in which annihilation occurred with emission of three gamma quanta. In this case, the momentum conservation principle implying movement of three annihilation quanta in one plane is used. An exemplary way of determining the vector indicating the point of annihilation into three gamma quanta ($\vec{r}_a$) and determining the time of annihilation into three gamma quanta ($t_a$), performed in step 115, is minimising the variable $\chi^2$ defined as:

$$\chi^2(v, t_a) = \sum_{i=1}^{3} ((t_i - t_a)c - d_{iv})^2 \quad \text{(Formula IV)}$$

where:
i—index of detection module which registered one of three annihilation gamma quanta
v—index of searched voxel
$d_{iv}$—distance between the position of reaction of gamma quantum in the i-th module and the centre of the v-th voxel
$t_a$—searched time in which annihilation took place
$t_i$—gamma quantum reaction time registered in i-th module
c—speed of light in vacuum For annihilation into three gamma quanta by using the momentum conservation principle, the number of searched voxels in the examined object is limited to voxels lying in the plane defined by three points which are the positions of reaction of gamma quanta in three detection modules. As the voxel in which annihilation ($v_a$) took place, and as annihilation time ($t_a$), the values for which $\chi^2(v_a, t_a)$ reaches a minimum value ($\chi^2_{min}$) are selected, while the value $\chi^2_{min}$ can also be used to assess the coplanarity of registered gamma quanta, and thus can constitute a criterion for rejecting events for which at least one of the gamma quanta is scattered.

Then, the distribution of time difference $\Delta t$ is calculated for each voxel separately: 114, 115, as follows:

$$\Delta t = t_a - t_e \quad \text{(Formula V)}$$

where:
$\Delta t$—time difference
$t_e$—deexcitation quantum emission time
$t_a$—time of annihilation Deexcitation quantum emission time ($t_e$) is calculated as time in which the deexcitation quantum interacted in the detection module less the time of flight of the quantum from the position of emission to the position of reaction in the scintillator material:

$$t_e = t_\mu - d_e/c \quad \text{(Formula VI)}$$

where:
$t_\mu$—interaction time of deexcitation gamma quantum in the detection module;
$d_e$—distance between the position of emission of deexcitation quantum and the position of reaction of gamma quantum in detection module;
it is assumed that the position of emission of deexcitation quantum is equivalent to the position of annihilation for the same event (Formula VI). This assumption may introduce a slight blur of 20 ps, negligible compared to ortho-positronium lifetime.

Distribution of time difference $\Delta t$ is approximately the sum of three distributions:

$$N(\Delta t) = N_b(\Delta t) + N_{p-Ps}(\Delta t) + N_{o-Ps}(\Delta t) \quad \text{(Formula VII)}$$

where:
$N_b(\Delta t)$—convolution of function describing the resolution of measurement of time difference $\Delta t$ with exponential function describing distribution of lifetimes of positron with direct positron annihilation
$N_{p-Ps}(\Delta t)$—convolution of function describing the resolution of measurement of time difference $\Delta t$ with exponential function describing distribution of lifetimes of para-positronium
$N_{o-Ps}(\Delta t)$—convolution of function describing the resolution of measurement of time difference $\Delta t$ with exponential function describing distribution of lifetimes of ortho-positronium Thus $N(\Delta t)$ can also be expressed in a more explicit form by means of the equation:

$$N(\Delta t) = R(\Delta t) * N_b^0 e^{-\Delta t/\tau_b} + R(\Delta t) * N_p^0 e^{-\Delta t/\tau_{p-Ps}} + R(\Delta t) * N_o^0 e^{-\Delta t/\tau_{o-Ps}} \quad \text{(Formula VIII)}$$

where:
$R(\Delta t)$—resolution function
$N_b^0$—number of direct annihilations
$N_p^0$—number of annihilations via para-positronium
$N_o^0$—number of annihilations via ortho-positronium
$\tau_b$—lifetime of the positron undergoing direct annihilation
$\tau_{p-Ps}$—lifetime of para-positronium
$\tau_{o-Ps}$—lifetime of ortho-positronium
e—Euler's number In the above equation (Formula VIII), the symbol "*" indicates convolution of functions, whereas the values of $N_b^0$, $N_p^0$, $N_o^0$ refer to the number of reconstructed annihilation with multiplicity of $\mu=3$ recorded during the entire imaging 117, wherein the sum of $N_b^0$, $N_p^0$, $N_o^0$ is equal to $N_0$ and it is the number of all events reconstructed from the whole imaging 117, which can be written as:

$$N_0 = \sum_{\Delta t=0}^{\infty} N(\Delta t) \quad \text{(Formula IX)}$$

When fitting the function (Formula VIII) to the data, it is assumed that $\tau_{p-Ps}=0.125$ ns, and it is taken into account that positronium in the triplet state is formed three times more often than in the singlet state ($3N_p^0 = N_o^0$) while the probability of creation of positronium is expressed as:

$$P_{poz} = (N_p^0 + N_o^0)/N_0 \quad \text{(Formula X)}$$

Finally, the measured distribution of the time difference $\Delta t$ is matched with the formula:

$$N(\Delta t) = R(\Delta t)*(1-P_{poz})N_0 e^{-\Delta t/\tau_b} + R(\Delta t)*\tfrac{1}{4}N_0 P_{poz} e^{-\Delta t/\tau_{p-Ps}} + R(\Delta t)*\tfrac{3}{4}N_0 P_{poz} e^{-\Delta t/\tau_{o-Ps}} \quad \text{(Formula XI)}$$

In the formula (Formula XI) $\tau_{o-Ps}$, $P_{poz}$ and $\tau_b$ are treated as free parameters. The lifetime of para-positronium $\tau_{p-Ps}$ is 125 ps, the lifetime of positron undergoing free annihilation $\tau_b$ is about 300 ps, which causes that the two first parts of a matching function (Formula XI) and resolution of $\Delta t$ determination, amounting to about 100 ps for a tomograph with polymer scintillation strips are relevant only in parts of the spectrum below 1 ns, while for the $\Delta t > 1$ ns dominates the third part of the matching function: $\tfrac{3}{4} N_0 P_{poz} e^{-\Delta t/\tau_{o-Ps}}$.

Indicators $\tau_{o-Ps}$ and $P_{poz}$ are determined based on the distribution of $N(\Delta t)$ by using the formula (Formula XI) separately for every voxel. Moreover, in the formula (Formula XI) an approximation was used that ortho-positronium annihilates only into two gamma quanta through the effect of "pick off". In fact, annihilations into three gamma quanta take place with a much larger decay constant. This approximation is satisfied with an accuracy of about 1%.

With sufficiently large statistics of events it is possible to independently determine the parameters $\tau_{o-Ps}$ from a fit to distribution of $N(\Delta t)$ $$N(\Delta t) = N_4 e^{-\Delta t/\tau_{o-Ps}} \quad \text{(Formula XII)}$$

determined for annihilation events into three gamma quanta ($\mu=4$), where $N_4$ is the number of annihilations of multiplicity of $\mu=4$ registered during the entire imaging 117.

Such procedures described above for the multiplicity $\mu=4$ and $\mu=3$ allow one to define morphometric indicators $\tau_{o-Ps}$ and $P_{poz}$ regardless of the gamma quanta attenuation in the body, so it is not necessary to perform correction taking into account the density distribution of the examined object's body (anatomical image), which is currently used for reconstruction of metabolic image and SUV index. This is due to the fact that energetic and angular distributions of gamma quanta for events with multiplicity of $\mu=3$ (for annihilation into two gamma quanta) are identical for all three parts of the equation described by Formula XI, and due to the fact that the absorption in the body of an examined object leads only to change in the value of $N_0$ and $N_4$. Indicators $\tau_{o-Ps}$ and $P_{poz}$ for annihilation into three gamma quanta can be determined in addition for larger areas of the body in case of suspicion of metabolic disorders in these areas. For example, in the course of evaluation of image $\tau_{o-Ps}(x,y,z)$ and $P_{poz}(x,y,z)$, one can select any area of $\Omega$ in the image using computer software to visualize 140 and start the procedure 117 to calculate the coefficients $\tau_{o-Ps}$ and $P_{poz}$ within the selected areas.

Variance of $\Delta t$ described with exponential distribution $\tau_{o-Ps} e^{-\Delta t/\tau_{o-Ps}}$ equals $(\tau_{o-Ps})^2 \sim 4$ ns$^2$. It is therefore more than two orders of magnitude greater than the variance resulting from experimental resolution of about 0.01 ns$^2$.

Therefore, the accuracy of $\tau_{o\text{-}Ps}$ determination in given area depends mainly on statistics of events recorded for this area. Thus, in order to achieve in a given voxel the accuracy of determination of $\tau_{o\text{-}Ps}$ of about 100 ps, the statistics of about 1000 events per voxel is required.

Preferably, in the first step, the mean morphometric parameters $\tau_{o\text{-}Ps}$ and $P_{poz}$ for the entire scanned area are determined; they are then used as initial parameters in fitting performed separately for each voxel.

Figure 2:
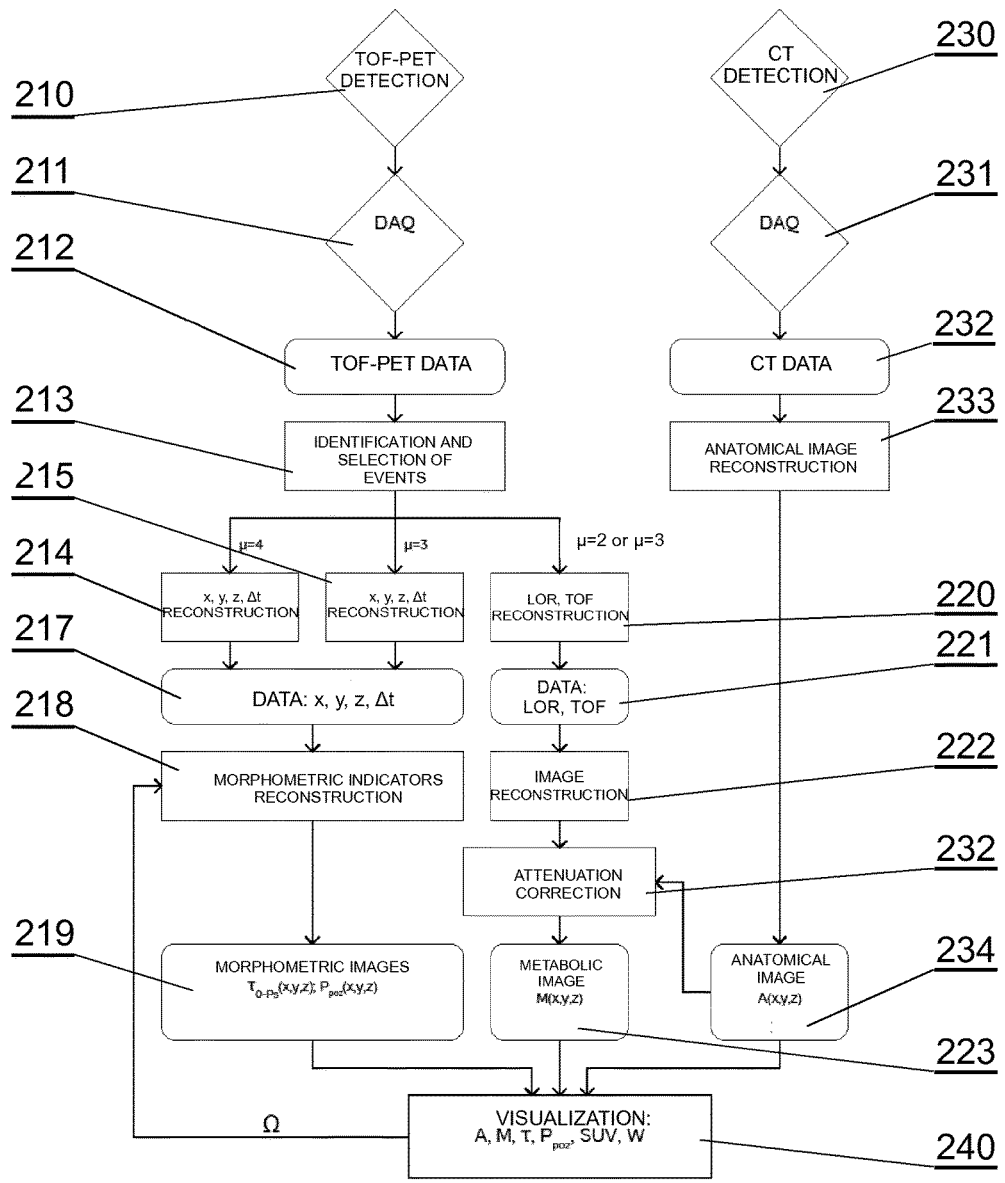
FIG. 2 is a block diagram of the process of reconstruction of images of distribution of lifetime of ortho-positronium in the second embodiment in an example of hybrid TOF-PET/CT tomograph.

FIG. 2 is a block diagram of the process of image reconstruction $\tau_{o\text{-}Ps}(x, y, z)$ and $P_{poz}(x, y, z)$ in the second embodiment using a TOF-PET/CT hybrid tomograph. The hybrid tomograph may comprise two types of detectors: TOF-PET detectors performing the measurement in step 210 and CT detectors performing detection in step 230, wherein the detection layer of TOF-PET comprises scintillators enabling achievement of time resolution of the detection system 210 of less than 100 ps.

The design of the TOF-PET/CT hybrid tomograph may vary. For example, the hybrid tomograph may comprise two scintillation chambers, one of which includes CT detectors, and the other includes TOF-PET detectors; then, the examined object is moved from one chamber to another during imaging. In addition, a tomograph may comprise a system of TOF-PET and CT detection layers stacked one on another, surrounding the tomograph detection chamber, in which the PET 210 detectors and the CT 230 register at the same time signals of gamma radiation and x-ray radiation.

As in the TOF-PET tomograph according to the first embodiment (FIG. 1), a TOF-PET/CT hybrid tomograph registers annihilation and deexcitation gamma quanta resulting from decay of radiotracer contained in the pharmaceutical, administered to the examined object before PET scanning commences. The recorded data is converted in step 211 and stored on computer disk in step 212. In the next step 213, the stored signals are identified and selected taking into account the multiplicity of events. Annihilation data 217 and 221 obtained from events $\mu=2$ and $\mu=3$ can be used to reconstruct a metabolic image M (x, y, z) 223, based on procedures 220, 221, and 222, known to specialist. A metabolic image 232 may be improved based on the examined object's density distribution obtained in step 234 on the basis of CT measurement data obtained in step 230, taken in steps 231 and 232 and reconstructed in step 233, in accordance with methods known to specialists.

However, data 217 obtained from events with multiplicity $\mu=3$ and $\mu=4$, recorded by the TOF-PET 210 detection system is used to reconstruct 214, 215, 218 of images: $\tau_{o\text{-}Ps}(x,y,z)$ and $P_{poz}$ (x, y, z) 219.

The images obtained: $\tau_{o\text{-}Ps}(x,y,z)$ or $P_{poz}(x, y, z)$ 219 can be, similarly to metabolic image M(x, y, z) 223, superimposed over the anatomical image 234 in order to improve the diagnostic capabilities.

Figure 3:
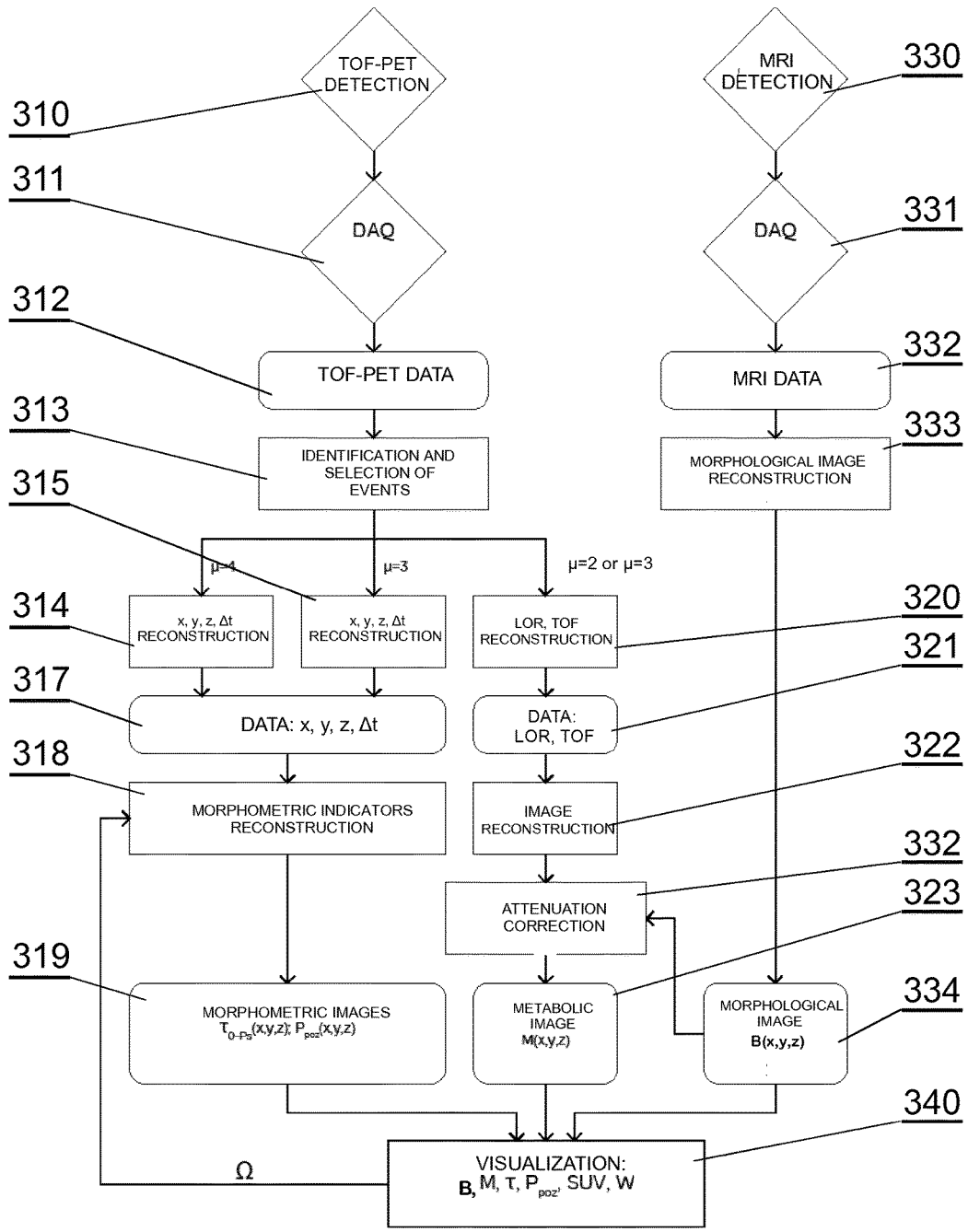
FIG. 3 is a block diagram of the process of reconstruction of images of distribution of lifetime of ortho-positronium in the third embodiment in an example of hybrid TOF-PET/MRI tomograph.

FIG. 3 is a block diagram of the process of image reconstruction $\tau_{o\text{-}Ps}(x,y,z)$ and $P_{poz}(x, y, z)$ according to the third embodiment using a TOF-PET/MRI hybrid tomograph. TOF-PET/MRI hybrid tomograph, similarly to TOF-PET/CT tomograph (FIG. 2) can contain two types of detectors: TOF-PET detectors 310 and MRI 330 detection layer for generating a magnetic field and recording nuclear magnetic resonance signals. The design of the hybrid tomograph may vary; for example the layer of TOF-PET 310 and MRI 330 detectors can be arranged parallel, one on another, surrounding the detector chamber of hybrid tomograph and allowing simultaneous recording of signals of gamma quanta and nuclear magnetic resonance. TOF-PET 310 and MRI 330 layers may also be physically separated, allowing the sequential scanning, wherein registration of gamma radiation and nuclear magnetic resonance signals takes place in a predetermined time interval. Reconstruction of images $\tau_{o\text{-}Ps}(x,y,z)$ or $P_{poz}(x,y,z)$ and M(x, y, z) may be carried out analogously to the first or second embodiment (FIG. 1-2); wherein the MRI 330 detectors of the hybrid tomograph allow obtaining morphological images which can be used for correction of metabolic image M(x, y, z), and images $\tau_{o\text{-}Ps}(x,y,z)$ or $P_{poz}$ P (x, y, z) 319 can be superimposed over morphological image in order to improve the diagnostic capabilities. A metabolic Image may be improved in step 332 based on morphological images in step 334 on the basis of MRI measurement data obtained in step 330, taken in steps 331 and 332 and reconstructed in step 333, in accordance with methods known to specialists.

Indicators $\tau_{o\text{-}Ps}$ and $P_{poz}$ determined by the presented method using a hybrid tomograph as per the first, second or third embodiment may be related to each other:

$$(\tau_{o\text{-}Ps} \cdot P_{poz})^{-1} \qquad \text{(Formula XIII)}$$

The expression (Formula XIII) determines well the degree of advancement of cell metabolism abnormality, wherein the larger the value $(\tau_{o\text{-}Ps} \cdot P_{poz})^{-1}$ the greater the severity of metabolic abnormalities. The advantage of the indicator described by Formula XIII is the fact that the values of $\tau_{o\text{-}Ps}$ and $P_{poz}$ do not depend on the time, so they do not have to be corrected due to the time elapsed from the injection of a radiopharmaceutical to an examined object to the time of imaging and due the weight and volume of the examined object. In addition, for the determination of the $\tau_{o\text{-}Ps}$ and $P_{poz}$, it is not necessary to know the physical and biological decay time of the radiopharmaceutical or the initial activity and time of injection of the radiopharmaceutical. Hence, the possibility of making systematic errors in determining the $\tau_{o\text{-}Ps}$ and $P_{poz}$ is lower.

Currently, for the evaluation of the PET tomographic images in view of quantitative determination of cellular metabolism, the SUV index is used. The higher the SUV the greater the risk of occurrence of tissue with cells with disturbed metabolism in a given region of the body. The SUV index does not depend on the lifetime of ortho-positronium $\tau_{o\text{-}Ps}$ and the probability of positronium production $P_{poz}$. Therefore, the presented method allows for association of SUV index with $\tau_{o\text{-}Ps}$ and $P_{poz}$ parameters, obtaining thereby a new index defined as:

$$W = \text{SUV} / (\tau_{o\text{-}Ps} \cdot P_{poz}) \qquad \text{(Formula XIV)}$$

In addition, the W index being a combination of indicators: SUV, $\tau_{o\text{-}Ps}$, and $P_{poz}$ is more "sensitive" to the occurrence of metabolic abnormalities in cells.

FIGS. 4, 5, and 6 are diagrams depicting design of tomographs used in procedures outlined respectively in FIGS. 1, 2, and 3.

TOF-PET tomograph shown in FIG. 4 includes TOF-PET 101 detection modules, which contain scintillators with time resolution of less than 100 ps. Data from these modules is transferred to the TOF-PET 102 data acquisition system, from which data is transferred to the data reconstruction system 103, which is responsible for carrying out the steps 113-123 of the procedure in FIG. 1. The resulting data is transmitted to the visualization module 104 performing step 140 of the procedure in FIG. 1.

TOF-PET/CT hybrid tomograph shown in FIG. 5, in addition to modules 201-204 analogous to modules 101-104 in FIG. 4, contains also the detection module CT 205, data acquisition system CT 206 and the data reconstruction system CT 207 (implementing steps 233, 234) from which data may be combined with the TOF-PET image in step 240.

TOF-PET/MRI hybrid tomograph shown in FIG. 6, in addition to modules 301-304 analogous to modules 101-104 in FIG. 4, contains also the detection module MRI 305, data acquisition system MRI 306 and the data reconstruction system MRI 307 (implementing steps 333, 334) from which data may be combined with the TOF-PET image in step 340.

The use of isotope tracers according to the presented method, wherein the daughter nucleus deexcites with emission of gamma quanta of energy different from the energy of annihilation quantum, a method of measuring the positron lifetime in living organisms was developed to be performed by methods known to TOF-PET tomographs specialists. The use of a tomograph with a detection system achieving time resolution of 100 ps made it possible to measure the difference ($\Delta t$) between the time of annihilation $t_a$ and time of emission of deexcitation quantum $t_e$; the appropriate choice of isotope tracers for which the average lifetime of the excited nucleus is less than 100 ps made it possible to adopt the approximation that the position of deexcitation is identical with the position of annihilation, which allowed determination of time of emission of deexcitation quantum $t_e$ for each voxel of the examined object separately. The measured distribution of time difference $N(\Delta t)$ made it possible, by means of the matching function, to determine lifetime of ortho-positronium $\tau_{o-Ps}$ and the probability of production of positronium $P_{poz}$ for each voxel of the examined object body. The values obtained were used to reconstruct two images: $\tau_{o-Ps}(x, y, z)$ and $P_{poz}(x, y, z)$ as a function of position in the examined object, which were not obtained by the PET technique. Images $\tau_{o-Ps}(x, y, z)$ and $P_{poz}(x, y, z)$ represent distribution of density of tissue and allow to determine the size of free volumes between cells in tissues in the nanometer scale, which allows detection of metabolic disorders even at a very early stage and allows for a quantitative assessment of severity of these disorders. In addition, information from images $\tau_{o-Ps}(x, y, z)$ and $P_{poz}(x, y, z)$ can be used to understand the process of destruction of the diseased cells and for development of new medicines.

It should be noted that the method of obtaining images of lifetime of ortho-positronium is completely non-invasive—it does not require collection of tissues of living organisms, and the area of the body possible to be examined depends exclusively on the imaging field of view used in the TOF-PET tomograph; for example, tomographs with polymer scintillation strips allow images of lifetimes of ortho-positronium even for the whole body of the examined object simultaneously.

In addition, the use of "fast" polymer scintillators to register events with two ($\mu=2$) and three ($\mu=3$) gamma quanta, allowed determination of time of recording gamma quanta with a better accuracy than 50 ps and the position of annihilation with a better accuracy than 1 cm. This provided the possibility to reconstruct the annihilation position (x, y, z) for each event separately with a centimeter-fraction accuracy and time accuracy better than 50 ps. Measurement of time and position of reaction of deexcitation quantum using polymer scintillators allows to determine the difference in time between the moment of emission of the positron and its annihilation with accuracy better than 100 ps.

The detection system of TOF-PET tomograph was designed to record also annihilations into three gamma quanta. In this case, it is possible to determine additional lifetime indicators of ortho-positronium and the probability of production of positronium for larger areas of the body, despite the fact that these events are statistically less frequent.

An important advantage of the presented method is the possibility of obtaining, while a single imaging, not only images of $\tau_{o-Ps}(x, y, z)$ and $P_{poz}(x, y, z)$ but also the metabolic image $M(x, y, z)$, which can be superimposed over each other. This is due to the fact that in the TOF-PET tomograph the detection modules can register deexcitation and annihilation radiation. These modules are identified by the presented method, by introducing the energy criterion $E_{min}$, which is a border value of the energy that the deexcitation and annihilation quanta may deposit in the scintillators. On the basis of $E_{min}$ it is identified which of the modules registered an annihilation quantum, and which registered a deexcitation quantum.

Furthermore, in order to obtain three images: $M(x, y, z)$, $\tau_{o-Ps}(x, y, z)$ and $P_{poz}(x, y, z)$ the radiopharmaceutical is administered to the examined object only once, and the technique of placing the examined object into the scintillation chamber and imaging time is not different from the PET technique.

The presented method of reconstruction of images: $\tau_{o-Ps}(x, y, z)$ and $P_{poz}(x, y, z)$ may also be used in TOF-PET/CT and TOF-PET/MRI hybrid tomographs, in which the detection systems for registration of gamma quanta allow achieving time resolution of 100 ps. The obtained CT or MRI images can then be superimposed over $\tau_{o-Ps}(x, y, z)$ and $P_{poz}(x, y, z)$ images, thereby increasing the diagnostic capabilities.

In addition, the obtained indicators of $\tau_{o-Ps}$ and $P_{poz}$ can be linked to SUV index to give a new W index, which is more "sensitive" to presence of metabolic abnormalities in the tissues.

While the technical solutions presented herein have been depicted, described, and defined with reference to particular preferred embodiment(s), such references and examples of implementation in the foregoing specification do not imply any limitation on the invention. Various modifications and changes may be made thereto without departing from the scope of the technical solutions presented. The presented embodiments are given as example only, and are not exhaustive of the scope of the technical solutions presented herein. Accordingly, the scope of protection is not limited to the preferred embodiments described in the specification, but is only limited by the claims that follow.

The invention claimed is:

1. A tomograph for imaging an interior of an examined object, the tomograph comprising:
   TOF-PET (Time-Of-Flight Positron Emission Tomography) detection modules configured to register annihilation quanta and deexcitation quanta; and
   a data reconstruction system configured to identify signals of a common event registered in at least two detection modules within a predetermined time interval, the common event comprising:
      registering three gamma quanta ($\mu=3$), wherein two of the three gamma quanta meet criteria for identification of quanta from annihilation of electron with positron into two gamma quanta and a third gamma quantum meets a criterion for identification of gamma quanta from deexcitation of daughter nucleus having the lifetime of the daughter nucleus in an excited state not exceeding 100 ps,
      or registering four gamma quanta ($\mu=4$), wherein at least one gamma quantum meets a criterion for identification of gamma quanta from deexcitation of a daughter nucleus having a lifetime of the daughter nucleus in an excited state not exceeding 100 ps, wherein the data reconstruction system is further configured to reconstruct an ortho-positronium $\tau_{o\text{-}Ps}(x,y,z)$ lifetime image and a probability of production of positronium $P_{poz}(x,y,z)$ as a function of position in the imaged object, on the basis of a difference ($\Delta t$) between a time of annihilation ($t_a$) and a time of emission of a deexcitation quantum ($t_e$) for the common events, wherein the TOF-PET detection modules comprise scintillators having a time resolution of less than 100 ps.

2. The tomograph according to claim 1 wherein the TOF-PET detection modules comprise polymer scintillation strips for absorbing gamma quanta.

3. The tomograph according to claim 1 wherein the TOF-PET detection modules comprise polymer scintillation panels for absorbing radiation.

4. The tomograph according to claim 1 wherein the tomograph is a hybrid TOF-PET/CT (Time-Of-Flight Positron Emission Tomography/Computed Tomography) tomograph further comprising a CT detection module and a visualization module configured to receive hybrid images containing information about the lifetime of ortho-positronium, the probability of production of positronium, the density distribution of the radiopharmaceutical, and the electron density distribution as a function of position.

5. The tomograph according to claim 1 wherein the tomograph is a hybrid TOF-PET/MRI (Time-Of-Flight Positron Emission Tomography/Magnetic Resonance Imaging) tomograph further comprising an MRI detection module, a visualization module to receive hybrid images containing information about the lifetime of ortho-positronium, the probability of production of positronium, the density distribution of the radiopharmaceutical, and the hydrogen atoms density distribution as a function of position.

6. A method of imaging using a TOF-PET (Time-Of-Flight Positron Emission Tomography) tomograph, the method comprising the steps of:
introducing into a scintillation chamber of the tomograph an object comprising a radioisotope to emit positrons and deexcitation gamma quanta having a lifetime of a daughter nucleus in an excited state not exceeding 100 ps;
recording the deexcitation quanta and annihilation quanta in a TOF-PET detection module comprising scintillators having a time resolution less than 100 ps;
determining detection modules that registered the annihilation gamma quanta and detection modules that registered the deexcitation quanta of a common event registered in at least two detection modules within a predetermined time interval, the common event comprising:
registering three gamma quanta ($\mu=3$), wherein two of the three gamma quanta meet criteria for identification of quanta from annihilation of electron with positron into two comma quanta and a third gamma quantum meets a criterion for identification of gamma quanta from deexcitation of daughter nucleus having the lifetime of the daughter nucleus in an excited state not exceeding 100 ps,
or registering four gamma quanta ($\mu=4$), wherein at least one gamma quantum meets a criterion for identification of gamma quanta from deexcitation of a daughter nucleus having a lifetime of the daughter nucleus in an excited state not exceeding 100 ps;

performing for the common events a reconstruction of the position of annihilation into two gamma quanta ($r_a$) and the time of annihilation into two gamma quanta ($t_a$);
performing reconstruction of a time difference ($\Delta t$) between a time of the positron annihilation $t_a$ and an emission time of deexcitation quantum $t_e$, where the position of emission of the deexcitation quantum is considered as the position of annihilation of the positron;
calculating, for every voxel, on the basis of the time difference ($\Delta t$) between a time of the positron annihilation $t_a$ and an emission time of deexcitation quantum $t_e$, an average lifetime of ortho-positronium $\tau_{o\text{-}Ps}(x,y,z)$ and a probability of production of positronium $P_{poz}(x,y,z)$.

7. The method according to claim 6 wherein the daughter nucleus of the radiotracer emits deexcitation quantum in less than 100 ps from the time of the positron emission.

8. The method according to claim 6 wherein the detection modules that registered the annihilation quanta and detection modules that registered the deexcitation quanta are distinguished by the difference in the values of energy deposited in those modules by the gamma quanta, whereas the range of the energy used to identify the annihilation and deexcitation gamma quanta is optimized for the energy resolution of the tomograph and for the energy of deexcitation quantum by maximizing the probability product of correct identification and selection efficiency as a function of the $E_{min}$ value.

9. The method according to claim 6 comprising recording the events wherein the detection modules registered, within a single time interval, two annihilation gamma quanta from the annihilation into two gamma quanta.

10. The method according to claim 6 comprising recording the events wherein the detector modules registered two annihilation quanta from annihilation into two gamma quanta, and at least one deexcitation quantum from deexcitation of the daughter nucleus.

11. The method according to claim 6 comprising recording the events wherein the detector modules registered three gamma quanta from annihilation into three gamma quanta, and at least one deexcitation quantum from deexcitation of the daughter nucleus.

12. The method according to claim 8 wherein the annihilation vector coordinates ($r_a$) are determined analytically from the position of measurement of gamma quanta reaction ($r_1$, $r_2$) in the detection modules and the difference in times of arrival of the quanta at the reaction position ($t_1$, $t_2$).

13. The method according to claim 9 wherein the annihilation time is determined on the basis of the difference in times of arrival of the quanta at the reaction position ($r_1$, $r_2$).

14. The method according to claim 11 wherein the position ($r_a$) and time of annihilation ($t_a$) are determined by minimizing the variable $\chi^2(v_a, t_a)$, wherein the number of searched voxels is limited to voxels located in the plane defined by trajectories of movement of three gamma quanta, wherein the voxel in which the annihilation occurred ($v_a$) is the one for which the variable $\chi^2$ reached the minimum value ($\chi^2$ min).

15. The method according to claim 14 comprising determining coplanarity of the registered gamma quanta on the basis of the value $\chi^2$min, and rejecting the events for which at least one gamma quantum is scattered.

16. The method according to claim 9 comprising reconstructing the image of density of distribution of the radiopharmaceutical M(x, y, z) for the recorded events for which the positron was subject to annihilation into two gamma quanta.

17. The method according to claim 10 wherein in the case of registered events in which the positron was subject to annihilation into two or three gamma quanta, the values of the lifetime of ortho-positronium ($\tau_{o\text{-}Ps}$) and the probability of production of positronium ($P_{poz}$) are reconstructed for designated areas ($\Omega$).

18. The method according to claim 6 wherein in the first step, the morphometric-average parameters $\tau_{o\text{-}Ps}$ and $P_{poz}$ for the entire scanned area are determined; next, the average parameters $\tau_{o\text{-}Ps}$ and $P_{poz}$ are used as initial parameters in matching, performed separately for each voxel.

19. The method according to claim 6 wherein the obtained image comprises information about the lifetime of ortho-positronium, the probability of production of positronium and the density distribution of the radiopharmaceutical as a function of position in the examined object.

20. The method according to claim 6 further comprising acquisition of data by using the CT detector module, and generating a hybrid image that contains information on the lifetime of positronium $\tau_{o\text{-}Ps}(x, y, x)$, the probability of production of positronium $P_{poz}(x, y, z)$, the density of radiopharmaceutical distribution M(x, y, z) and the electron density distribution A(x, y, z) as functions of position in the object.

21. The method according to claim 6 further comprising data acquisition by using the MRI detector module, and generating a hybrid image that contains information on the lifetime of positronium $\tau_{o\text{-}Ps}(x, y, x)$, the probability of production of positronium $P_{poz}(x, y, z)$, the density of radiopharmaceutical distribution M(x, y, z) and the hydrogen atoms density distribution B(x, y, z) as a function of position in the object.

22. The method according to claim 10 wherein the annihilation vector coordinates ($r_a$) are determined analytically from the position of measurement of gamma quanta reaction ($r_1$, $r_2$) in the detection modules and the difference in times of arrival of the quanta at the reaction position ($t_1$, $t_2$).

23. The method according to claim 10 wherein the annihilation time is determined on the basis of the difference in times of arrival of the quanta at the reaction position ($r_1$, $r_2$).

24. The method according to claim 10 comprising reconstructing the image of density of distribution of the radiopharmaceutical M(x, y, z) for the recorded events for which the positron was subject to annihilation into two gamma quanta.

25. The method according to claim 11 wherein in the case of registered events in which the positron was subject to annihilation into two or three gamma quanta, the values of the lifetime of ortho-positronium ($\tau_{o\text{-}Ps}$) and the probability of production of positronium ($P_{poz}$) are reconstructed for designated areas ($\Omega$).

\* \* \* \* \*